United States Patent
Fox et al.

(10) Patent No.: US 11,348,043 B2
(45) Date of Patent: May 31, 2022

(54) COLLECTIVE-AWARE TASK DISTRIBUTION MANAGER USING A COMPUTER

(71) Applicant: International Business Machines Corporation, Armonk, NY (US)

(72) Inventors: Jeremy R. Fox, Georgetown, TX (US); Kelley Anders, East New Market, MD (US); Chen Liang, Dublin (IE); Andrew Charles Whiriskey, Galway (IE)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 16/566,131

(22) Filed: Sep. 10, 2019

(65) Prior Publication Data

US 2021/0073712 A1    Mar. 11, 2021

(51) Int. Cl.
*G06Q 10/06* (2012.01)
*G06Q 10/10* (2012.01)

(52) U.S. Cl.
CPC ........... *G06Q 10/063114* (2013.01); *G06Q 10/1091* (2013.01)

(58) Field of Classification Search
CPC ....... G06Q 10/063114; G06Q 10/1091; G06Q 10/063116; G06Q 10/1097; G06Q 10/06316; G06Q 10/0639
See application file for complete search history.

(56) References Cited

U.S. PATENT DOCUMENTS

| | | | | |
|---|---|---|---|---|
| 5,408,663 A * | 4/1995 | Miller | ................... | G06Q 10/06 718/104 |
| 6,070,144 A * | 5/2000 | Ginsberg | ............... | G06Q 10/06 705/7.17 |
| 7,353,465 B2 | 4/2008 | Callaway | | |
| 8,271,631 B1 * | 9/2012 | Horvitz | ................. | G06Q 10/10 709/223 |
| 9,401,845 B2 * | 7/2016 | Cazanas | ................ | H04L 41/082 |
| 10,445,702 B1 * | 10/2019 | Hunt | .................. | G06Q 10/1097 |
| 10,715,387 B1 * | 7/2020 | Tutuianu | ................. | H04L 43/08 |
| 10,811,139 B1 * | 10/2020 | Wang | .................... | G16H 50/50 |
| 2002/0082901 A1 * | 6/2002 | Dunning | ........... | G06Q 30/0277 705/26.63 |

(Continued)

OTHER PUBLICATIONS

Dwarakanath, et al., "A Decentralized System for Privacy-Preserving Context Exchange: Facilitating a Better Work-Life Balance", 2014 IEEE 22nd International Conference on Network Protocols, pp. 489-491.

(Continued)

*Primary Examiner* — Rutao Wu
*Assistant Examiner* — Stephen S Swartz
(74) *Attorney, Agent, or Firm* — Michael A. Petrocelli

(57) ABSTRACT

A method, system and computer program product for automatically distributing tasks within a group includes identifying, by one or more processors, first data associated with each member of a group. The one or more processors identify second data associated with demands for the group, calculate a total work time for each member of the group using the first data, identify conflicts between the total work time for each member of the group and the second data, and based on the identified conflict, distribute tasks among members of the group.

18 Claims, 7 Drawing Sheets

(56) References Cited

U.S. PATENT DOCUMENTS

| | | | |
|---|---|---|---|
| 2002/0120486 A1* | 8/2002 | Thompson | G06Q 10/06315 705/7.17 |
| 2003/0081757 A1* | 5/2003 | Mengshoel | H04M 3/5233 379/265.06 |
| 2007/0179829 A1* | 8/2007 | Laperi | G06Q 10/063116 705/7.16 |
| 2008/0059291 A1 | 3/2008 | McCall | |
| 2008/0177836 A1 | 7/2008 | Bennett | |
| 2009/0094613 A1* | 4/2009 | Maw | G06F 9/505 718/105 |
| 2009/0112677 A1* | 4/2009 | Rhett | G06Q 10/109 705/7.21 |
| 2009/0228815 A1 | 9/2009 | Dellinger | |
| 2010/0049574 A1* | 2/2010 | Paul | G06Q 50/04 705/7.25 |
| 2011/0040764 A1* | 2/2011 | Duchon | G06Q 10/04 707/738 |
| 2012/0215578 A1* | 8/2012 | Swierz, III | G06Q 50/205 705/7.14 |
| 2012/0290950 A1* | 11/2012 | Rapaport | H04N 21/8358 715/753 |
| 2015/0220883 A1 | 8/2015 | B'Far | |
| 2016/0314120 A1* | 10/2016 | Dauderman | G06F 16/437 |
| 2017/0061356 A1* | 3/2017 | Haas | G06Q 10/06316 |
| 2017/0116552 A1* | 4/2017 | Deodhar | G06Q 10/06316 |
| 2017/0303841 A1 | 10/2017 | Badenes | |
| 2017/0318103 A1 | 11/2017 | Kamath | |
| 2017/0330147 A1 | 11/2017 | Hook | |
| 2018/0018614 A1 | 1/2018 | Vajracharya | |
| 2018/0026910 A1* | 1/2018 | Balle | G06F 3/0683 709/226 |
| 2018/0143975 A1* | 5/2018 | Casal | G06F 40/58 |
| 2018/0189743 A1* | 7/2018 | Balasubramanian | G06N 5/025 |
| 2018/0307998 A1* | 10/2018 | Strachan | G06N 7/005 |
| 2019/0286462 A1* | 9/2019 | Bodnick | G06F 9/453 |
| 2019/0334907 A1* | 10/2019 | Rodden | G06Q 10/063116 |
| 2020/0065736 A1* | 2/2020 | Relangi | G06Q 10/0639 |

OTHER PUBLICATIONS

Mell et al., "The NIST Definition of Cloud Computing", National Institute of Standards and Technology, Special Publication 800-145, Sep. 2011, 7 pages.

Thomee, et al., "Computer use and stress, sleep disturbances, and symptoms of depression among young adults—a prospective cohort study", BMC Psychiatry 2012, 12:176, 14 pages, <https://bmcpsychiatry.biomedcentral.com/articles/10.1186/1471-244X-12-176>.

Westwood, et al., "Work-Life Optimization: Using Big Data and Analytics to Facilitate Work-Life Balance", 2016 49th Hawaii International Conference on System Sciences, pp. 1701-1709.

* cited by examiner

COLLECTIVE-AWARE TASK DISTRIBUTION MANAGER USING A COMPUTER

BACKGROUND

The present invention generally relates to the field of data collection and analysis, and more particularly to a method, system and computer program product for automatically distributing tasks within a group.

In general, organizations aim for improving the overall health and productivity of their employees and their work climate. Employees with an increased workload often exhibit higher stress levels. During times in which one or more employees within a group or department of the organization are absent for a certain reason (e.g., vacations, leave of absence, etc.), their workload is often redistributed between remaining members of the group. In some cases, tasks may not be equally assigned thereby increasing the workload (and associated stress levels) of some employees with respect to others. Typical task distribution techniques focus on balancing work and personal commitments on an individual basis without considering collective needs and demands.

SUMMARY

Shortcomings of the prior art are overcome and additional advantages are provided through the provision of a method for automatically distributing tasks within a group. The method includes, identifying, by one or more processors, first data associated with each member of a group and second data associated with demands for the group, using the first data, calculating, by the one or more processors, a total work time for each member of the group, identifying, by the one or more processors, conflicts between the total work time for each member of the group and the second data, and based on the identified conflict, distributing, by the one or more processors, tasks among members of the group.

Another embodiment of the present disclosure provides a computer program product for automatically distributing tasks within a group, based on the method described above.

Another embodiment of the present disclosure provides a computer system for automatically distributing tasks within group, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Balance between work engagements and activities outside work are key for a person's wellbeing. This balance between work and personal activities (frequently referred to as "work-life balance") is also important for the groups to which that person belongs. While employees of an organization may need challenging tasks to maintain their interest and motivation, and to develop new skills, it is important that demands do not exceed their ability to cope and do not disrupt their personal life. In general, employees can cope with demanding work if it is not excessive and are supported by colleagues.

The wellbeing of a group can be defined as a zero-sum game in which each person's gain or loss of work engagements is exactly balanced by the losses or gains of work engagements of the other persons within the same group. Current research and technologies aim to address individual work-life balance issues. However, the effects on a group or groups to which the individual belongs are often ignored. For example, an employee taking a vacation day when the due date of an important project is approaching may substantially increase the workload of other employees within the same department. Existing technologies ignore the zero-sum approach described above thereby distributing a person's individual work-life activities without considering the impact on the group's needs and demands.

Embodiments of the present invention generally relates to the field of data collection and analysis, and more particularly to a method, system and computer program product for automatically distributing tasks within a group. The following described exemplary embodiments provide a system, method, and computer program product to, among other things, automatically distribute work assignments or tasks within a group by analyzing individual activities (e.g., computer usage, movement, location, uptime, work time, down time, calendars, finance, and health data) and group needs (e.g., company culture, deadlines, high peak work demand, and low peak work demand). Therefore, the present embodiments have the capacity to improve the technical field of data collection and analysis by continuously balancing the needs of a group with the needs of each individual within that group. Additionally, predictive behavior analysis and crowdsourced stress levels are used to distribute group as well as individual tasks in a collective-aware fashion.

Figure 1:
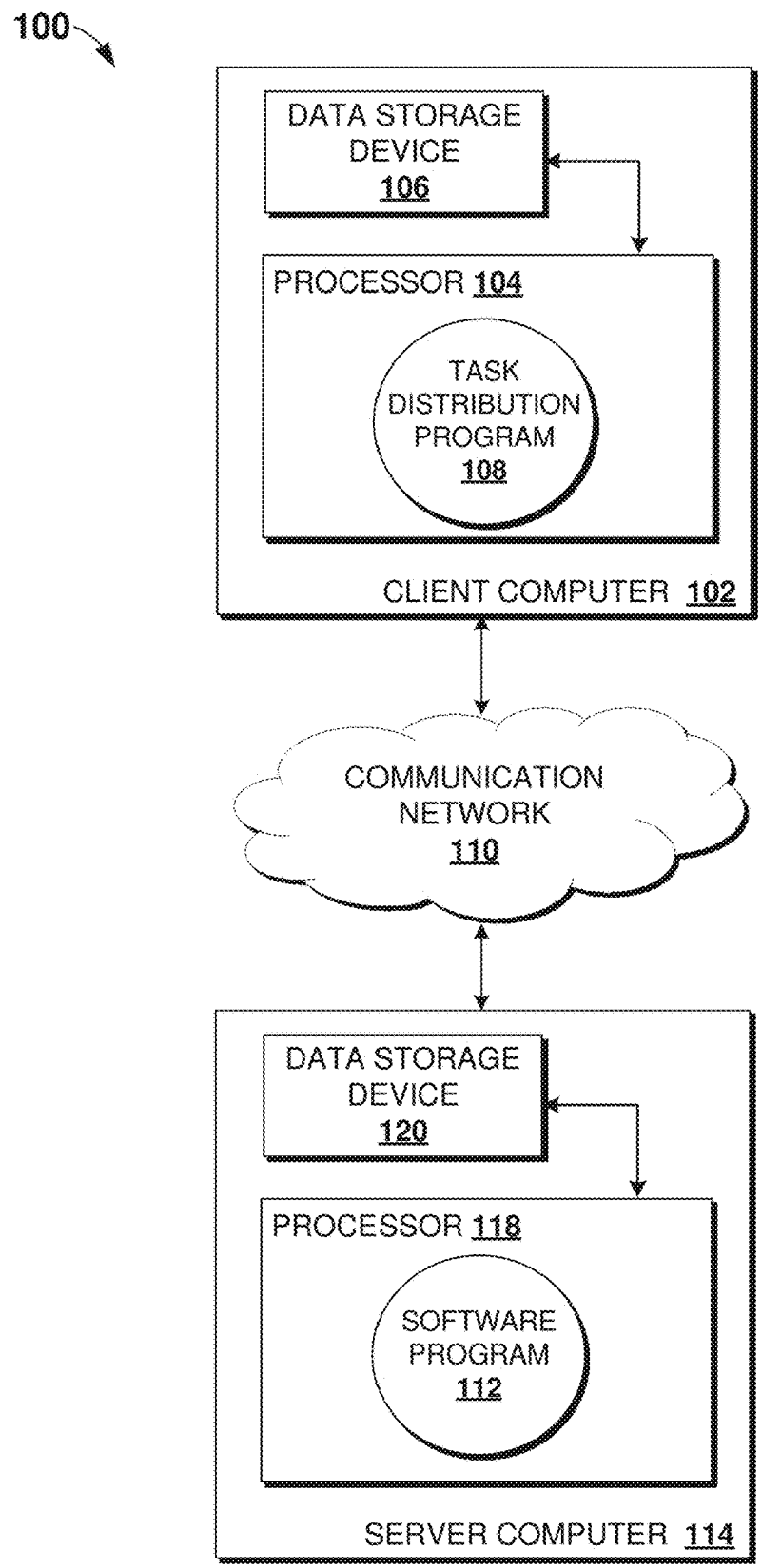
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104 and a data storage device 106 that is enabled to run a task distribution program 108. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118 and a data storage device 120 that is enabled to run a software program 112. The software program 112 may be, for example, an application program such as email or calendar program(s). In some embodiments, server computer 114 may be a resource management server, a web server or any other electronic device capable of receiving and sending data. In another embodiment, server computer 114 may represent a server computing system utilizing multiple computers as a server system, such as in a cloud computing environment.

The task distribution program 108 running on client computer 102 may communicate with the software program 112 running on server computer 114 via the communication network 110. As will be discussed with reference to FIG. 5, client computer 102 and server computer 114 may include internal components and external components.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
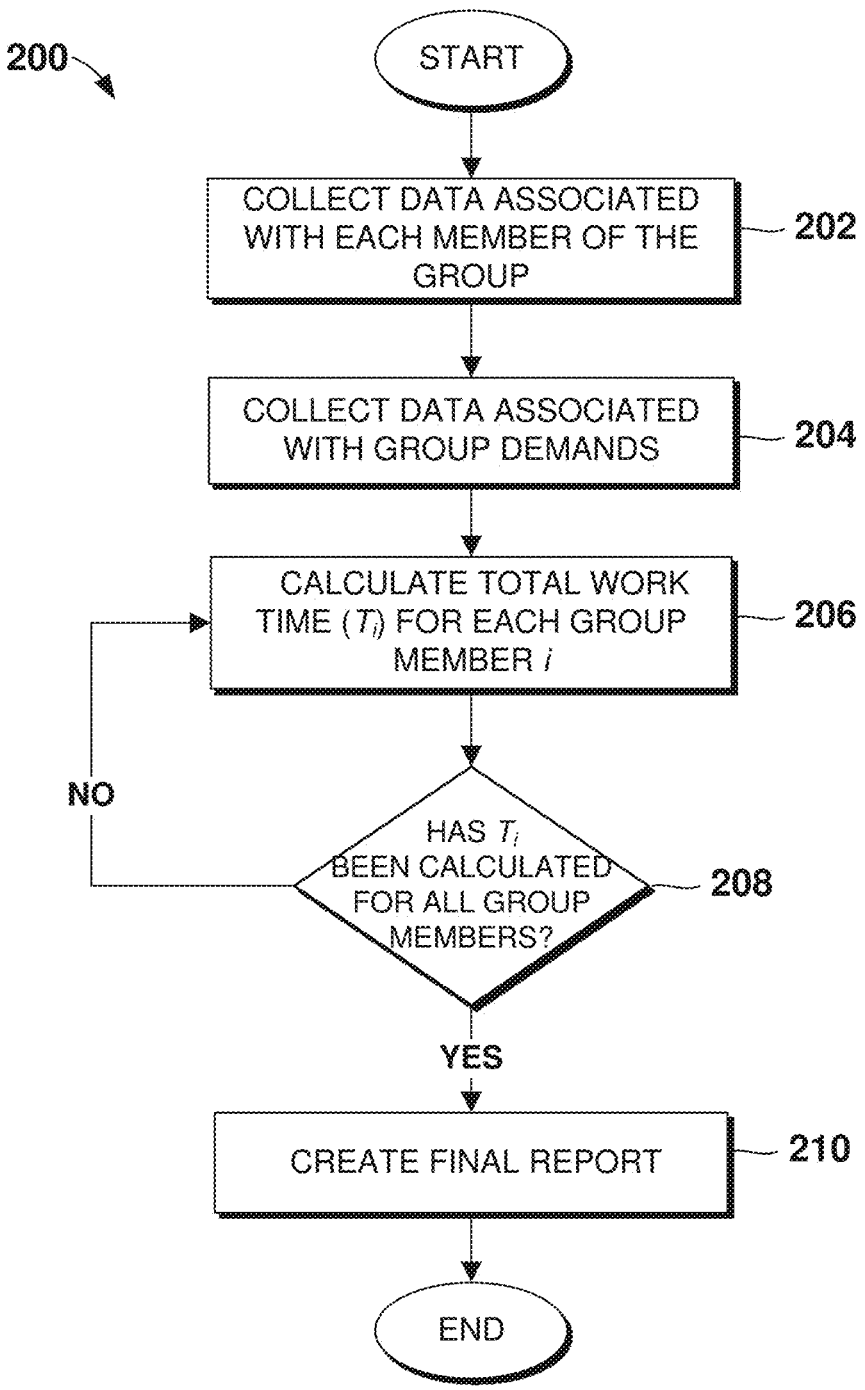
FIG. 2 is a flowchart illustrating a method for automatically distributing tasks, according to an embodiment of the present disclosure.

Referring now to FIG. 2, a flowchart illustrating the steps of a method for automatically distributing tasks is shown, according to an embodiment of the present disclosure. The method starts at step 202 by collecting first data corresponding to work and personal activities/engagements for each member of a group. Each group member includes, for example, an employee part of a specific department or team within an organization. The first data can be collected from different information sources such as emails, calendars, and the like. The collected first data may include information regarding working hours, assigned tasks, planned vacations, experience, abilities, etc.

At step 204, second data associated with group demands and needs is collected. In some embodiments, the second data can be analyzed to determine periods of high work demand. It should be noted that embodiments of the present disclosure consider periods of high work demand as being associated with increased work-related stress. The second data can be collected from different information sources including, for example, work email, organization calendars, project management programs, etc. The second data may include project deadlines, projections, customer demands, important dates such as holidays, end-of-year, end-of-quarter, and the like.

It should be noted that data collection is done with the consent of each group member via, for example, an opt-in and opt-out feature. As known by those skilled in the art, an opt-in and opt-out feature generally relates to methods by which a participating status can be modified (i.e., accept or reject the data collection). In some embodiments, the opt-in and opt-out feature can include a software application(s) available in the client computer 102. Additionally, each group member can choose to stop having his/her information being collected or used. In some embodiments, each group member can be notified each time data is being collected and can stop the data collection at any time. The collected data is envisioned to be secured and not shared with anyone without consent.

According to an embodiment, the first data and second data can be mapped to a database table. For example, Table 1 below shows a database containing collected first data that provides information regarding the workload during a determined week (e.g., first week of the month of September) for a group of employees.

TABLE 1

Workload during Week 1

| Employee | Vacation Time ($V_i$) days | Working Time ($W_i$) days | Primary Task |
|---|---|---|---|
| Person 1 | 2 | 5 | Calculate Salaries |
| Person 2 | 4 | 3 | Calculate Salaries |
| Person 3 | 7 | 0 | Calculate Salaries |

Similarly, Table 2 shows a database containing collected second data corresponding to demands for the exemplary group of employees of Table 1:

TABLE 2

Group Demands

| Task Name | Volume (number of employees in the company) |
|---|---|
| Calculate Salaries for all employees in the company (deadline Sep. 15, 2019) | 100 |

At step 206, an effect or impact of the collected first data on each group member is calculated. To calculate the effect of each member's activities/engagements (either personal or work-related) on the group as a whole, it is assumed that the total work time ($T_i$) of an individual (member) within the group equals the assigned work time ($W_i$) plus the vacation time of all other members $\Sigma_{i=1}^{n} V_i$ divided by the number of other members (n−1) minus his/her vacation time ($V_i$), which is given by the following equation:

$$T_i = W_i + \frac{\sum_{i=1}^{n} V_i}{n-1} - V_i \quad (1)$$

where i refers to each (individual) employee within the group (0≤i≤n), and n indicates the total number of employees within the group (n>1).

Equation 1 derives from the assumption that an absent time (e.g., vacation time, sick leave, etc.) of a member of the group is additional work time for the other members. Thus, by using Equation 1 to calculate the total work time of each group member (e.g., employee), workload during absent times can be evenly distributed between remaining members of the group.

The first data is analyzed to identify $W_i$, $V_i$ and $V_i$ values and calculate the total work time ($T_i$) for each employee or group member. Returning to the example of Table 1, the collected first data is used to calculate the total work time ($T_i$) for each employee. For example, according to the database of Table 1, there are three employees in the group that do the same task (i.e., calculate salaries for all employees in the company). Person 1 works five (5) days a week in week 1. Person 2 works three (3) days during the same week, and Person 3 takes the week off. Based on this information, Equation 1 is used to calculate the total work time ($T_i$) for each member of the group, as shown in Table 3 below.

TABLE 3

Calculated Total Worktime

| Employee | Vacation Time ($V_i$) days | Working Time ($W_i$) days | Primary Task | Total Work time ($T_i$) days |
|---|---|---|---|---|
| Person 1 | 2 | 5 | Calculating Salaries | 8.5 |
| Person 2 | 4 | 3 | Calculating Salaries | 3.5 |
| Person 3 | 7 | 0 | Calculating Salaries | −4 |

By calculating the total work time ($T_i$) of each group member, conflicts between group members as well as conflicts between each group member and the group as a whole can be identified. The collected second data can be compared against the calculated total work time to detect conflicts between each group member and the group. Based on the identified conflicts, work tasks can be redistributed among group members. For example, from Table 3, it can be appreciated that Person 1 has the highest value of total worktime ($T_i$) while Person 3 has the lowest value. Thus, to meet the deadline of Sep. 15, 2019 to calculate salaries for all employees, the proposed task distribution model may advise Person 3 to take less vacation days during Week 1.

According to an embodiment, it is assumed that the calculated total work time is directly proportional to a stress level of each employee. Based on this assumption, Person 1 has the highest stress level while Person 3 has the lowest. Stated differently the calculated total work time may be a stress level indicator for each employee within the group.

Figure 3A:
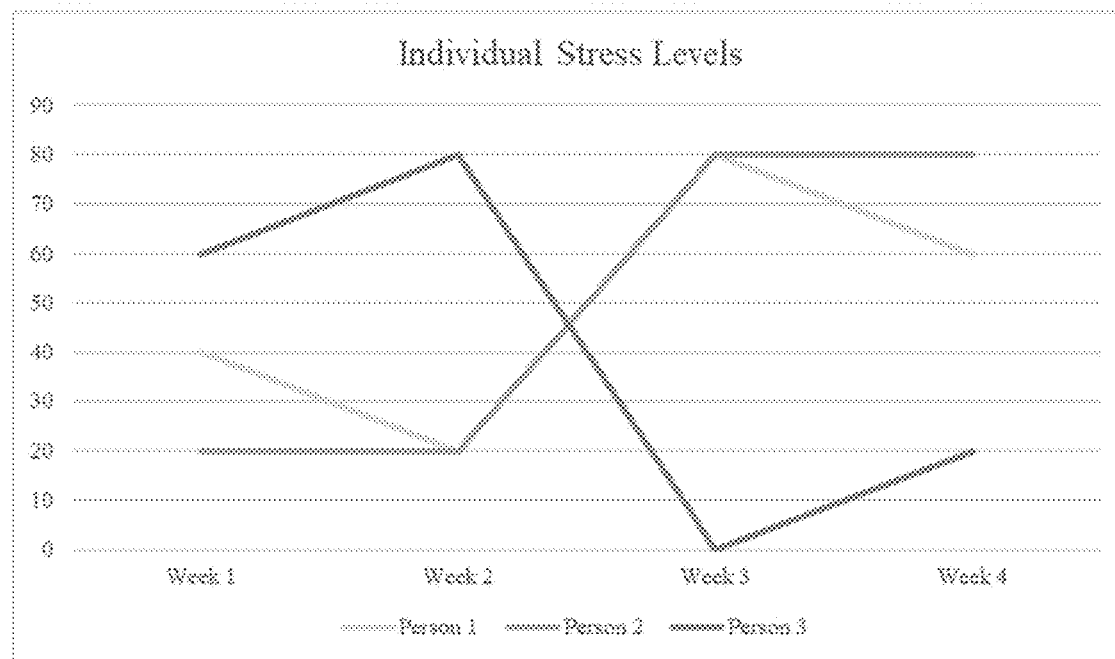
FIGS. 3A-3B are exemplary charts depicting individual and group stress level indicators, according to an embodiment of the present disclosure.
Figure 3B:
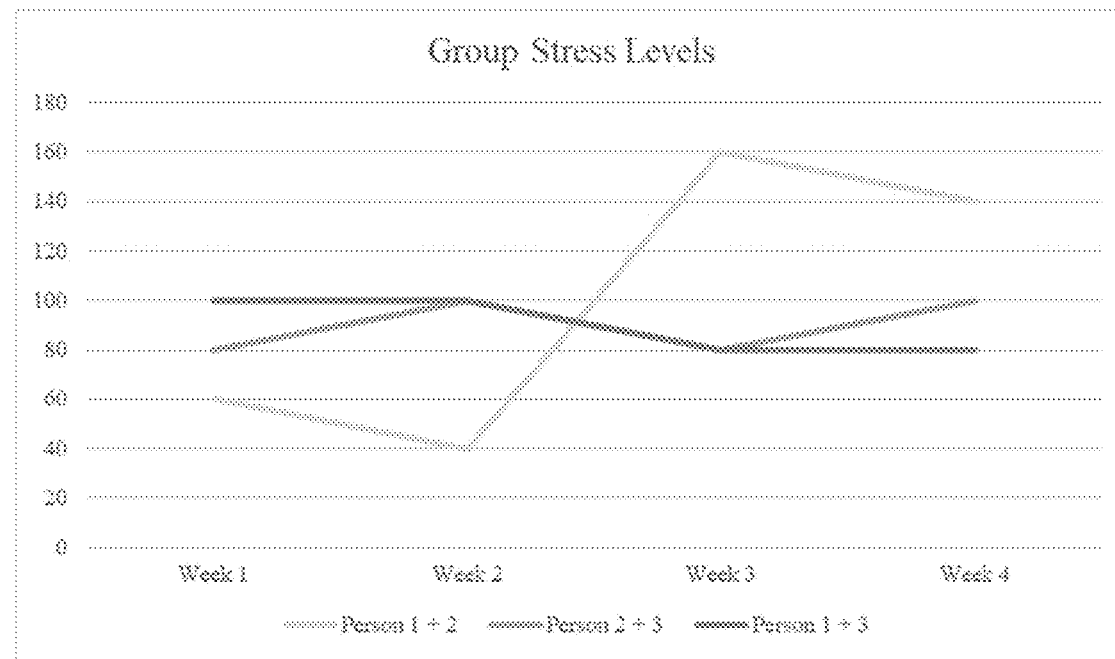

In some embodiments, charts depicting stress level indicators associated with each employee within the group and for the group as a whole can be generated based on the above assumption, as shown in FIGS. 3A-3B. In FIG. 3A exemplary stress level indicators for each group member are shown, while exemplary stress level indicators for the entire group are shown in FIG. 3B. For instance, individual stress level indicators in FIG. 3A can be generated by calculating the total work time ($T_i$) of each employee over a period of time (x-axis) and expressing it as a percentage of the total work time of the group (y-axis). Accordingly, the employee (person) with the highest work percentage over a certain period of time has the highest stress level indicator. As can be observed in FIG. 3A, Person 1 and Person 2 have the most combined stress level indicators in Week 3. The stress level indicator for the entire group depicted in FIG. 3B can be determined by combining the total work load of all employees (persons) within the group.

It should be noted that, in some embodiments, sample data can be used to determine, or complement the determination of, stress level indicators associated with each member of the group and of the group as a whole. Combining individual and collective stress level information with the calculated total work time ($T_i$) may benefit a more balanced and efficient distribution of tasks within the group. In some cases, the stress level indicator of each member of the group can be determined using a linear regression model which can be trained using the sample data (e.g., working hours, assignments, emails, vacation time, project deadlines, demands, and the like).

Figure 4:
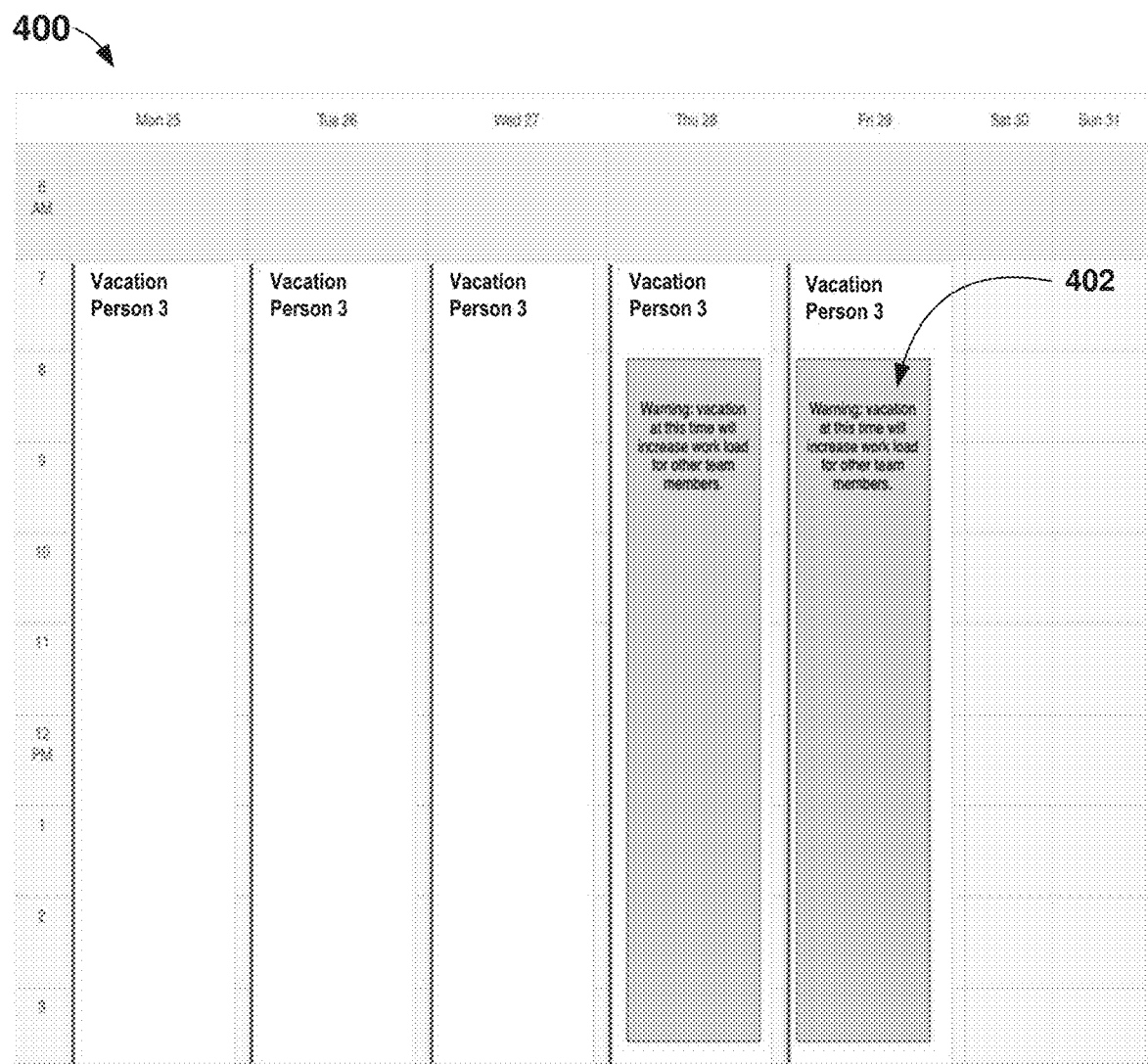
FIG. 4 is an exemplary calendar entry depicting an increased workload warning, according to an embodiment of the present disclosure.

From the visualizations presented in FIGS. 3A-3B, the stress level information can be fed to any number of programs, such as calendaring, project management software, spreadsheets, for use in team (group) conversations. For instance, in the example above, data associated to the total work time ($T_i$) calculated at step 206 and estimated individual and group stress levels may be fed to a calendar program 400 which may display a warning message 402 on Person 3 calendar indicating that the time she has selected for vacation can increase the workload of Person 1 and Person 2, as illustrated in FIG. 4.

Furthermore, crowdsourced stress data can also be incorporated to expand predictive capabilities of the proposed task distribution model. Specifically, crowdsourced stress level indicators based on the relative stress typically experienced by humans during certain times of the year can be included to provide additional weighting to the model. For example, external events such as the holiday season or end-of-year requests may increase group stress levels.

Once the total work time has been calculated for each group member, the process continues with step 210 in which a final report is generated based on the first data, second data, and total work time data. The final report may include, for example, suggested worst and best times to schedule off time, possible backup personnel, dates of low/high work demand, etc. Information provided in the final report can be fed to shared programs such as calendars, or any other planning tool.

Therefore, the described embodiments provide a method, system, and computer program product that efficiently organize and analyze work-life data associated with a group of individuals to derive a collective-aware model that is capable of automatically distributing work tasks based on a balance between personal and group activities.

Figure 5:
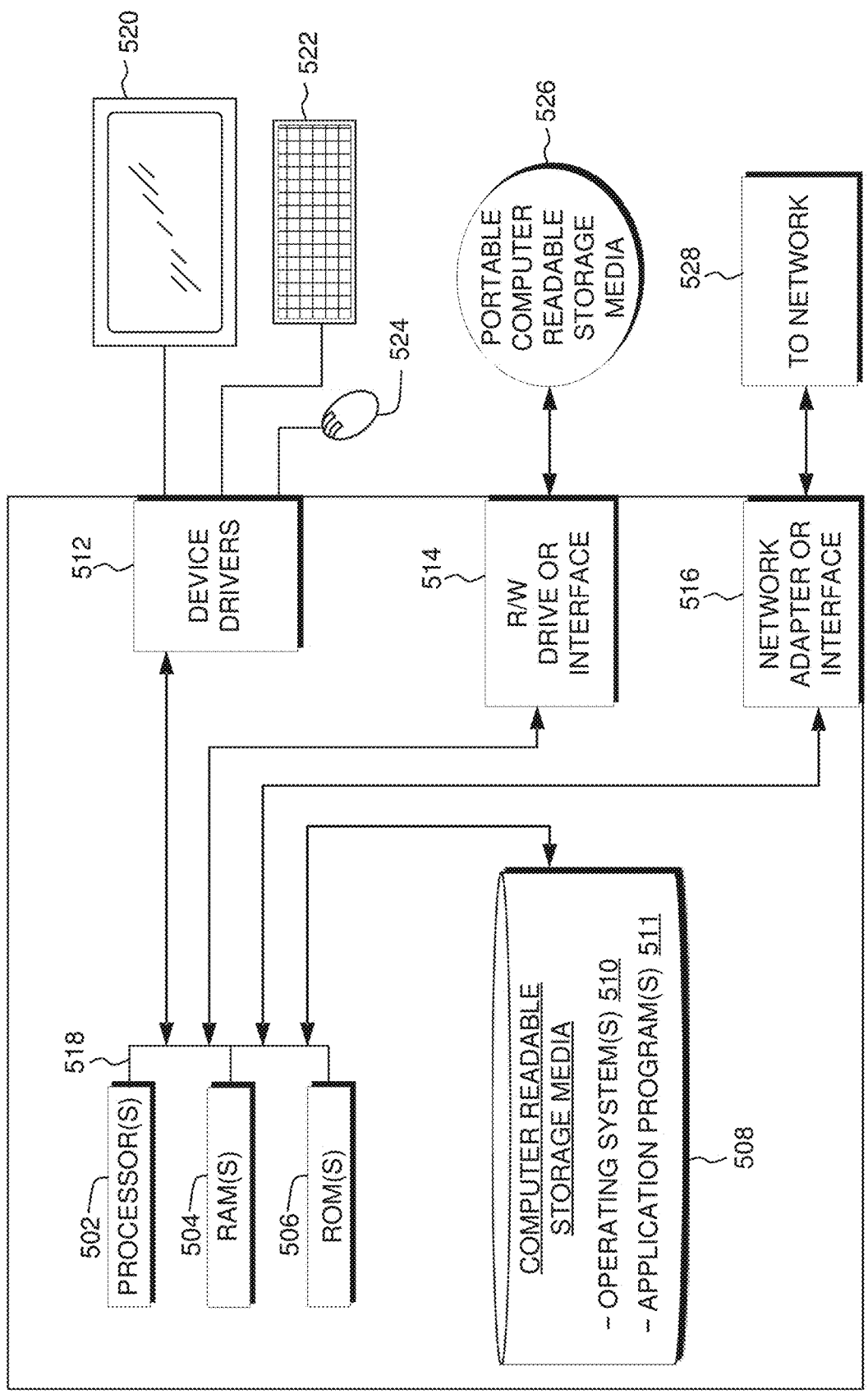
FIG. 5 is a block diagram of internal and external components of a computer system, according to an embodiment of the present disclosure.

Referring now to FIG. 5, a block diagram of components of client computer 102 and server computer 114 of networked computer environment 100 of FIG. 1 is shown, according to an embodiment of the present disclosure. It should be appreciated that FIG. 5 provides only an illustration of one implementation and does not imply any limitations regarding the environments in which different embodiments may be implemented. Many modifications to the depicted environment may be made.

Client computer 102 and server computer 114 may include one or more processors 502, one or more computer-readable RAMs 504, one or more computer-readable ROMs 506, one or more computer readable storage media 508, device drivers 512, read/write drive or interface 514, network adapter or interface 516, all interconnected over a communications fabric 518. Communications fabric 518 may be implemented with any architecture designed for passing data and/or control information between processors (such as microprocessors, communications and network processors, etc.), system memory, peripheral devices, and any other hardware components within a system.

One or more operating systems 510, and one or more application programs 511 are stored on one or more of the computer readable storage media 508 for execution by one or more of the processors 502 via one or more of the respective RAMs 504 (which typically include cache memory). In the illustrated embodiment, each of the computer readable storage media 508 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 514 to read from and write to one or more portable computer readable storage media 526. Application programs 511 on client computer 102 and server computer 114 may be stored on one or more of the portable computer readable storage media 526, read via the respective R/W drive or interface 514 and loaded into the respective computer readable storage media 508.

Client computer 102 and server computer 114 may also include a network adapter or interface 516, such as a TCP/IP adapter card or wireless communication adapter (such as a 4G wireless communication adapter using OFDMA technology) for connection to a network 528. Application programs 511 on client computer 102 and server computer 114 may be downloaded to the computing device from an external computer or external storage device via a network (for example, the Internet, a local area network or other wide area network or wireless network) and network adapter or interface 516. From the network adapter or interface 516, the programs may be loaded onto computer readable storage media 508. The network may comprise copper wires, optical fibers, wireless transmission, routers, firewalls, switches, gateway computers and/or edge servers.

Client computer 102 and server computer 114 may also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 may include hardware and software (stored on computer readable storage media 508 and/or ROM 506).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
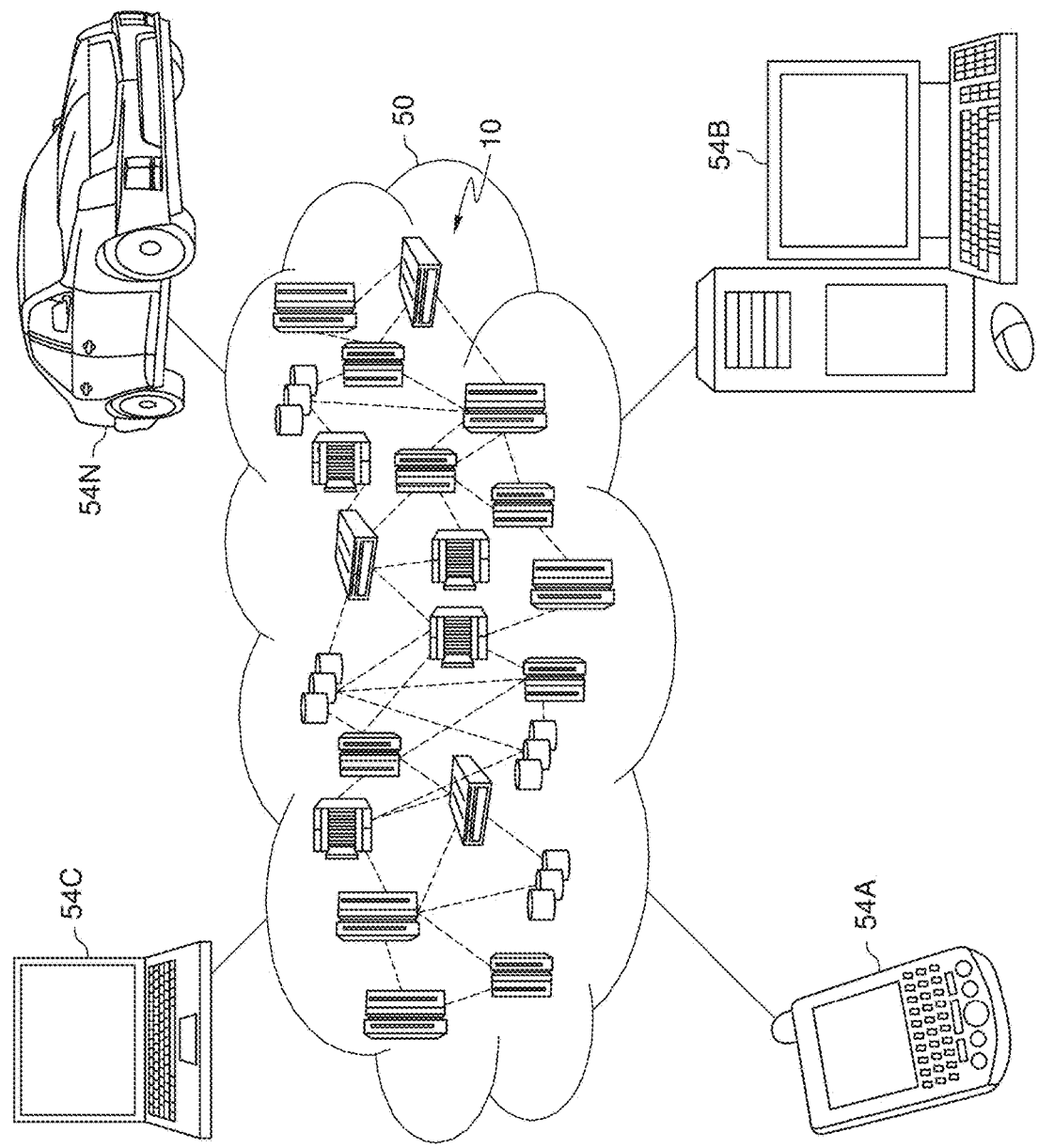
FIG. 6 is a block diagram of an illustrative cloud computing environment, according to an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
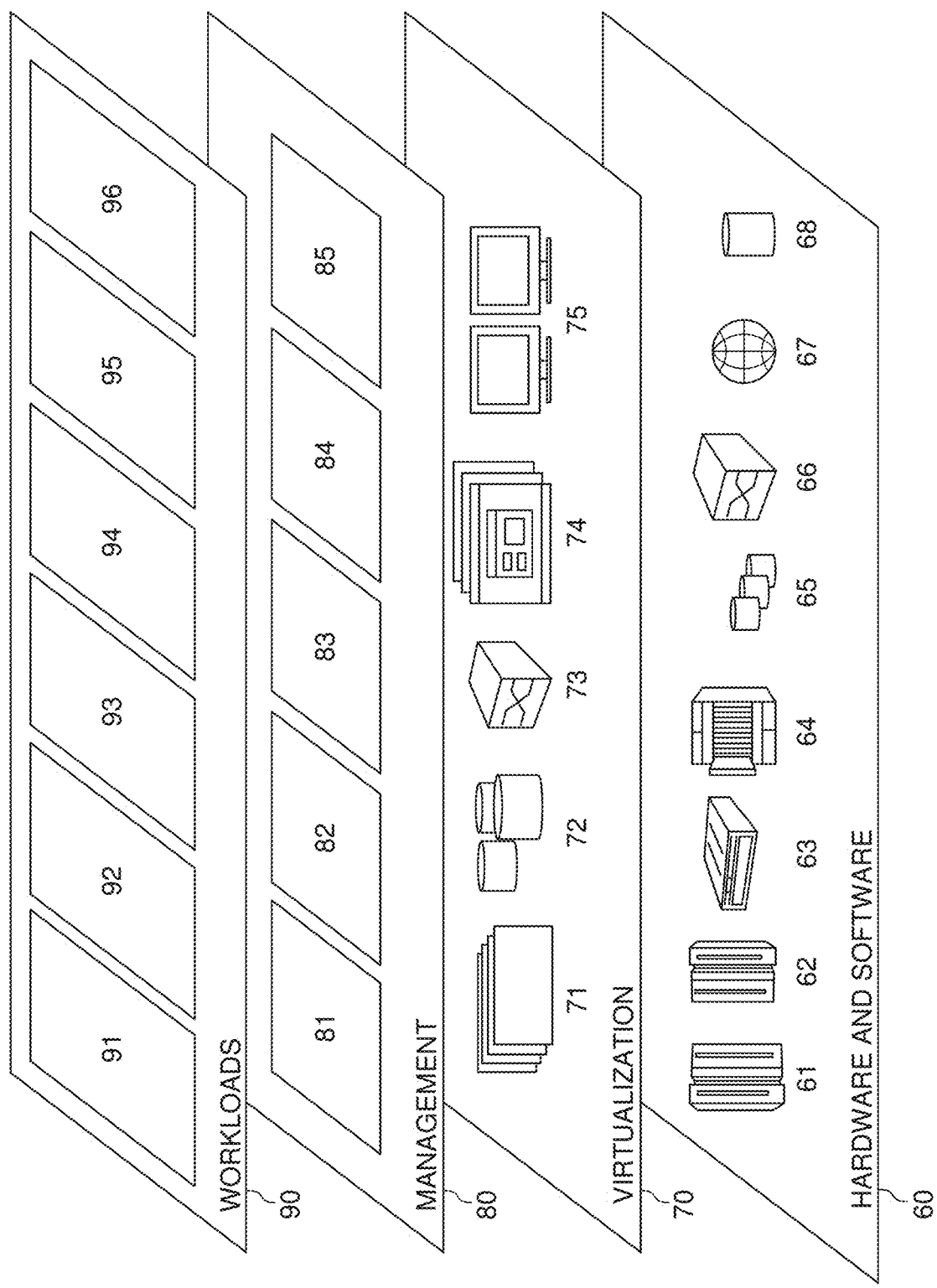
FIG. 7 is a block diagram of functional layers of the illustrative cloud computing environment of FIG. 6, according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for automatically distributing tasks within a group 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatically distributing tasks, comprising:
   receiving, by one or more processors, first data associated with each member of a group, the data being received from one or more devices associated with each member of the group;
   receiving, by the one or more processors, second data associated with a workload of the group;
   mapping, by the one or more processors, the first data and the second data to a database comprising workload information;
   calculating, by the one or more processors, a total work time for each member of the group using the first data, the total work time being equal to a work time assigned to a member of the group plus a sum of all vacation times associated with remaining members of the group divided by a number of remaining members of the group minus a vacation time of the member of the group;
   training a linear regression model using the first data and the second data;
   based on the calculated total work time and the trained linear regression model, calculating, by the one or more processors, a first workload indicator associated with each member of the group and a second workload indicator associated with the group as a whole, the first workload indicator including the total work time for each member of the group over a period of time expressed as a percentage of a total work time of the group as a whole, the second workload indicator including a total workload of the group;
   collecting, by the one or more processors, crowdsourced stress data to improve the linear regression model for calculating the first workload indicator and the second workload indicator;
   automatically determining, by the one or more processors, a change in the first workload indicator of at least one member of the group in response to a change in the first workload indicator of at least another member of the group and a current second workload indicator;
   based on the change in the first workload indicator of the at least one member of the group exceeding a workload criteria, displaying, by the one or more processors, a warning message to the at least another member of the group;
   based on the change in the first workload indicator of the at least one member of the group and the current second workload indicator, calculating, by the one or more processors, a new total work time for each member of the group; and
   updating, by the one or more processors, a scheduling application associated with the group based on the new total work time for each member of the group.

2. The method of claim 1, further comprising:
   generating, by the one or more processors, a report including the determined change in the first workload indicator of the at least one member of the group.

3. The method of claim 1, wherein the first data comprises at least one of working hours, work assignments, planned vacations, experience and abilities.

4. The method of claim 1, wherein the workload information included in the second data comprises at least one of project deadlines, projections and customer demands, end-of-year deadlines, end-of-quarter deadlines, and holiday season schedule.

5. The method of claim 1, further comprising:
   in response to the update, displaying, by the one or more processors, a notification to the at least another member of the group affecting the first workload indicator of the at least one member of the group.

6. The method of claim 1, wherein the crowdsourced stress data comprises crowdsourced stress level indicators based on relative stress typically experienced by humans during certain times.

7. A computer system for automatically distributing tasks, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   receiving, by one or more processors, first data associated with each member of a group, the data being received from one or more devices associated with each member of the group;
   receiving, by the one or more processors, second data associated with a workload of the group;
   mapping, by the one or more processors, the first data and the second data to a database comprising workload information;
   calculating, by the one or more processors, a total work time for each member of the group using the first data, the total work time being equal to a work time assigned to a member of the group plus a sum of all vacation times associated with remaining members of the group divided by a number of remaining members of the group minus a vacation time of the member of the group;
   training a linear regression model using the first data and the second data;
   based on the calculated total work time and the trained linear regression model, calculating, by the one or more processors, a first workload indicator associated with each member of the group and a second workload indicator associated with the group as a whole, the first workload indicator including the total work time for each member of the group over a period of time expressed as a percentage of a total work time of the group as a whole, the second workload indicator including a total workload of the group;

collecting, by the one or more processors, crowdsourced stress data to improve the linear regression model for calculating the first workload indicator and the second workload indicator;

automatically determining, by the one or more processors, a change in the first workload indicator of at least one member of the group in response to a change in the first workload indicator of at least another member of the group and a current second workload indicator;

based on the change in the first workload indicator of the at least one member of the group exceeding a workload criteria, displaying, by the one or more processors, a warning message to the at least another member of the group;

based on the change in the first workload indicator of the at least one member of the group and the current second workload indicator, calculating, by the one or more processors, a new total work time for each member of the group; and updating, by the one or more processors, a scheduling application associated with the group based on the new total work time for each member of the group.

8. The computer system of claim 7, further comprising:
generating, by the one or more processors, a report including the determined change in the first workload indicator of the at least one member of the group.

9. The computer system of claim 7, wherein the first data comprises at least one of working hours, work assignments, planned vacations, experience and abilities.

10. The computer system of claim 7, wherein the workload information included in the second data comprises at least one of project deadlines, projections and customer demands, end-of-year deadlines, end-of-quarter deadlines, and holiday season schedule.

11. The computer system of claim 7, further comprising:
in response to the update, displaying, by the one or more processors, a notification to the at least another member of the group affecting the first workload indicator of the at least one member of the group.

12. The computer system of claim 7, wherein the crowdsourced stress data comprises crowdsourced stress level indicators based on relative stress typically experienced by humans during certain times.

13. A computer program product for automatically distributing tasks, comprising:
a computer readable storage medium having program instructions embodied therewith, wherein the computer readable storage medium is not a transitory signal per se, the program instructions executable by a device to cause the device to perform a method comprising:
receiving, by one or more processors, first data associated with each member of a group, the data being received from one or more devices associated with each member of the group;
receiving, by the one or more processors, second data associated with a workload of the group;
mapping, by the one or more processors, the first data and the second data to a database comprising workload information;

calculating, by the one or more processors, a total work time for each member of the group using the first data, the total work time being equal to a work time assigned to a member of the group plus a sum of all vacation times associated with remaining members of the group divided by a number of remaining members of the group minus a vacation time of the member of the group;

training a linear regression model using the first data and the second data;

based on the calculated total work time and the trained linear regression model, calculating, by the one or more processors, a first workload indicator associated with each member of the group and a second workload indicator associated with the group as a whole, the first workload indicator including the total work time for each member of the group over a period of time expressed as a percentage of a total work time of the group as a whole, the second workload indicator including a total workload of the group;

collecting, by the one or more processors, crowdsourced stress data to improve the linear regression model for calculating the first workload indicator and the second workload indicator;

automatically determining, by the one or more processors, a change in the first workload indicator of at least one member of the group in response to a change in the first workload indicator of at least another member of the group and a current second workload indicator;

based on the change in the first workload indicator of the at least one member of the group exceeding a workload criteria, displaying, by the one or more processors, a warning message to the at least another member of the group;

based on the change in the first workload indicator of the at least one member of the group and the current second workload indicator, calculating, by the one or more processors, a new total work time for each member of the group; and updating, by the one or more processors, a scheduling application associated with the group based on the new total work time for each member of the group.

14. The computer program product of claim 13, further comprising:
generating, by the one or more processors, a report including the determined change in the first workload indicator of the at least one member of the group.

15. The computer program product of claim 13, wherein the first data comprises at least one of working hours, work assignments, planned vacations, experience and abilities.

16. The computer program product of claim 13, wherein the workload information included in the second data comprises at least one of project deadlines, projections and customer demands, end-of-year deadlines, end-of-quarter deadlines, and holiday season schedule.

17. The computer program product of claim 13, further comprising:
in response to the update, displaying, by the one or more processors, a notification to the at least another member of the group affecting the first workload indicator of the at least one member of the group.

18. The computer program product of claim 13,
wherein the crowdsourced stress data comprises crowdsourced stress level indicators based on relative stress typically experienced by humans during certain times.

* * * * *